US007415397B2

(12) United States Patent
Monson et al.

(10) Patent No.: US 7,415,397 B2
(45) Date of Patent: Aug. 19, 2008

(54) FREQUENCY SHIFTING ISOLATOR SYSTEM

(75) Inventors: Robert J. Monson, St. Paul, MN (US); Julia A. Neuman, St. Paul, MN (US); Jianhua Yan, Prior Lake, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 536 days.

(21) Appl. No.: 11/051,829

(22) Filed: Feb. 4, 2005

(65) Prior Publication Data

US 2006/0178859 A1 Aug. 10, 2006

(51) Int. Cl.
G06F 17/10 (2006.01)
G06F 17/50 (2006.01)
(52) U.S. Cl. .................... 703/2; 703/1; 428/71
(58) Field of Classification Search .......... 703/1, 703/2, 6; 361/685; 340/825.72; 250/221; 360/97.01; 267/141, 141.1; 181/207; 398/182; 428/71, 131, 137
See application file for complete search history.

(56) References Cited

U.S. PATENT DOCUMENTS

| | | | | |
|---|---|---|---|---|
| 3,714,438 | A * | 1/1973 | Hahn et al. | 398/182 |
| 5,227,592 | A * | 7/1993 | Kosters et al. | 181/207 |
| 5,766,720 | A | 6/1998 | Yamagishi et al. | |
| 6,394,435 | B1 | 5/2002 | Monson | |
| 6,435,490 | B1 * | 8/2002 | Monson et al. | 267/141 |
| 6,473,263 | B2 * | 10/2002 | Jang et al. | 360/97.01 |
| 6,749,924 | B2 | 6/2004 | Monson et al. | |
| 6,783,835 | B2 | 8/2004 | McCollough et al. | |
| 7,164,117 | B2 * | 1/2007 | Breed et al. | 250/221 |
| 2005/0046584 | A1 * | 3/2005 | Breed | 340/825.72 |
| 2006/0044748 | A1 * | 3/2006 | Connelly et al. | 361/685 |

OTHER PUBLICATIONS

Abdelhafez et al., H. Resonance of Multiple Frequency Excited Systems with Quadratic, Cubic and Quartic Non-linearity, Mathematics and Computers in Simulation, vol. 61, No. 1, Nov. 2002, pp. 17-34.*
McConnell, V. Application of Composites in Sporting Goods, Comprehensive Composite Materials, 2003, pp. 787-809.*
Suleman et al., A. Adaptive Control of an Aeroelastic Flight Vehicle Using Piezoelectric Actuators, Computers & Structures, vol. 82, Jul. 2004, pp. 1303-1314.*

* cited by examiner

*Primary Examiner*—Russell Frejd
(74) *Attorney, Agent, or Firm*—Hamre, Schumann, Mueller & Larson, P.C.

(57) ABSTRACT

The present invention provides a method for designing a frequency-shifting isolator system that includes selecting, an impact absorption envelope; a geometry for the isolator mount system; and an elastomeric dampening material formed in the selected geometry. The isolator mount system is preferably configured to shift frequencies at predetermined displacements upon impact, at or before the system attains resonance.

31 Claims, 7 Drawing Sheets

FREQUENCY SHIFTING ISOLATOR SYSTEM

BACKGROUND OF THE INVENTION

1. Field of the Invention

This invention relates generally to shock and vibration protection devices and systems, and more particularly to a technique for implementing frequency shifting isolator devices and systems that shift natural frequencies when approaching a resonance point.

2. Description of the Prior Art

Nearly all objects vibrate when hit, struck or somehow disturbed. Vibration of objects continues to pose a challenge for operators, especially in environments where sensitive equipments are connected to surfaces that may be subjected to impacts, shocks or unintended disturbances.

Materials having dampening properties are widely used in applications where shock and vibrations must be minimized. These materials are increasingly used in applications requiring minimal or no equipment failures due to impact forces or vibrations. Such applications include sports equipment, tools, electronics, automobiles, airplanes and the like. As an example, computers used in harsh, rugged environments may be damaged if adequate dampening materials and systems are not provided to address potential impacts and vibrations.

There have been advances in materials that offer dampening qualities, and their uses have been broadened. Some of these materials are suggested in U.S. Pat. No. 5,766,720, issued to Yamagishi, et al. on Jun. 16, 1998, and include natural rubbers, synthetic resins such as polyvinyl chlorides, polyurethanes, polyamides, polystyrenes, copolymerized polyvinyl chlorides, polyolefin synthetic rubbers, as well as urethanes, EPDM, styrene-butadiene rubbers, nitriles, isoprene, chloroprenes, polypropylene, and silicones.

Further, users of materials having impact absorption and shock isolation properties have long desired to understand how to better design products that can meet or exceed expected impact requirements, without the routine of trial and error testing after the products have already been manufactured. The present invention addresses these concerns.

SUMMARY OF THE INVENTION

The present invention is directed to a technique for designing a frequency shifting isolator system and/or device that in one embodiment includes establishing a desired impact absorption envelope, selecting a geometry for the isolator system, and providing an elastomeric dampening material that is formed in the selected geometry. The elastomeric dampening material is preferably configured to shift frequencies at predetermined displacements upon impact within the desired impact absorption envelope, such that the frequency shifts of the isolator system occur prior to the isolator attaining resonance after impact.

Most preferably, the frequency shifting isolator system and/or device is implemented by first defining displacement-natural frequency requirements that are subsequently translated into displacement-spring factor requirements using techniques that are well known to those skilled in the structural design, shock and vibration arts. System and/or device structural requirements are then defined to include system/device weight of the sprung mass, shock and vibration input spectra and system/device momentum constraints. A structure is then designed to meet the forgoing momentum constraints. Finally, the structure is modified using scientific principles also well known to those skilled in the shock and vibration arts, including but not limited to, prior design experience, mathematics, material and elastomerics, statics and dynamics, deformable body mechanics, statistics, mechanical engineering-structural, shock and vibration energy transfer principles, and so forth. This modified structure will be implemented, often with some minimal experimentation dictated by prior shock and vibration design experience, to enable frequency shifting at appropriate displacements.

BRIEF DESCRIPTION OF THE DRAWINGS

Other aspects and features of the present invention and many of the attendant advantages of the present invention will be readily appreciated as the invention becomes better understood by reference to the following detailed description when considered in connection with the accompanying drawing figures in which like reference numerals designate like parts throughout the figures thereof and wherein.

Figure 1:
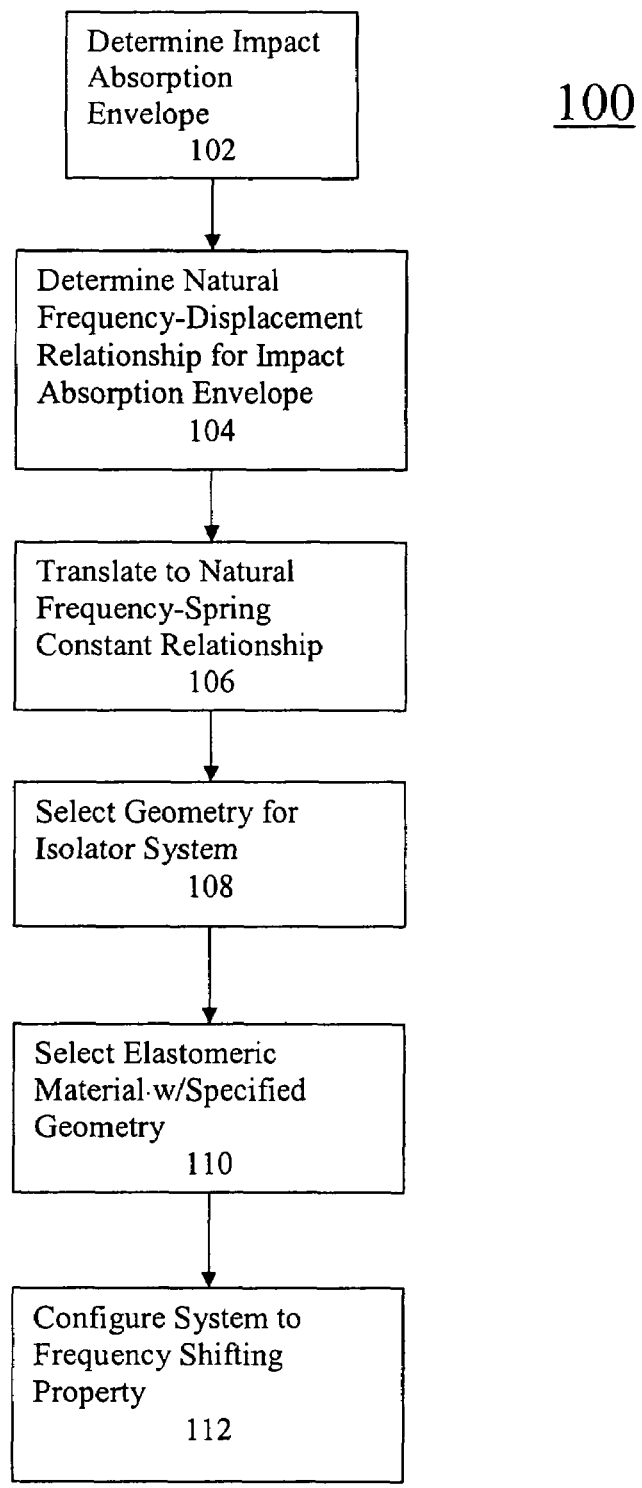
FIG. 1 is a flowchart depicting process steps for designing a frequency-shifting isolator system/device in accordance with the principles of the present invention.

While the above-identified drawing figures set forth alternative embodiments, other embodiments of the present invention are also contemplated, as noted in the discussion. In all cases, this disclosure presents illustrated embodiments of the present invention by way or representation and not limitation. Numerous other modifications and embodiments can be devised by those skilled in the art which fall within the scope and spirit of the principles of this invention.

DETAILED DESCRIPTION OF THE PREFERRED EMBODIMENTS

The present invention, as stated herein before, is directed to a technique for implementing a frequency-shifting isolator system such that in use, an impact to a system equipped with an isolator embodied in accordance with the principles of the present invention, may be dampened out prior to the system attaining resonance after impact. Although the present description is primarily directed to systems having at least one isolator, the invention is not limited to such applications.

As used herein, an "isolator system" refers to a mount or a configuration of mounts that is usable to support one or more platforms or apparatus on which an equipment of interest is connected. The isolator system may be in any form that provides a means for dampening the effect of an impact on an attached platform or apparatus. An impact may be instantaneous or a continuing vibration. As an example, an isolator system may comprise one or more elastomeric material mounts removably or permanently connected to two or more surfaces. It may also include a system with one or more spring loaded or spring supported constructions that are usable for the purpose of dampening a shock or vibration on an apparatus that is removably or permanently attached to a platform or surface of interest. The use of "system" in this disclosure broadens the unintended limitation whereby different materials or constructions are used to effect an intended dampening result.

One embodiment of the present invention, as stated herein before, is directed to a method for designing a frequency shifting isolator system that includes establishing a desired impact absorption envelope, selecting a geometry for the isolator system and providing an elastomeric dampening material that is preferably configured in the selected geometry. The terms "isolator system," "isolator mount system" and "isolator mount" are used interchangeably herein to denote a mount or construction that is employed for the purpose of isolating shock or impact. The elastomeric dampening material provided is preferably adapted to shift frequencies at predetermined displacements upon impact within the desired impact absorption envelope. Preferably, these frequency shifts of the system occur as the isolator system attains or prior to the isolator system attaining resonance after being impacted.

Typically, elastomeric materials usable in an isolator system are made individually or in batches and sampled or selectively tested to ascertain that each batch produced has the capacity to withstand desired impact levels. Most of these evaluations may be destructive or ascertained after manufacture of the material. The present invention differs from the conventional approach in that a desired impact envelope is preferably established and an isolator system is designed to meet the demands of that impact absorption envelope. A benefit of the present invention is that destructive testing routines used in conventional systems may not be utilized or necessary. Further, the trial and error testing routines as are presently used in conventional systems may be avoided.

In accordance with the principles of the present invention, a desired impact envelope may be selected or determined for a variety of uses such as, a need to maintain a fragile equipment in a harsh environment or determination of a system's capacity to withstand shock, vibration, and the like.

As referenced in this disclosure, "fragile equipment" means equipment that may be damaged or otherwise rendered inoperable if impacted by unanticipated shock in the environment of use. Such damage may also affect the equipment if vibrations are of sufficient magnitude to cause degradation of the isolator system.

Conventionally, a new isolator mount is made in a design similar to a known model or shape. Some variations are then incorporated in the mount thickness, height, or other dimensions to improve their performance for varying environments. The present invention eliminates the need to be confined to a particular design or model. Instead, once the impact envelope is decided upon, a best-fit geometry and characteristics of the mount are proposed for use as a mount. In some scenarios, the performance parameters may be input into a database to obtain the preferred geometry and characteristics.

Looking now at FIG. 1, a flow chart illustrates a method 100 of implementing a frequency-shifting isolator system according to one embodiment of the present invention. The method can be seen to include an initial determination of the desired impact absorption envelope as shown in block 102. This determination commences by first determining the natural frequency to displacement relationship as depicted in block 104 for the impact absorption envelope and then translating the natural frequency to displacement relationship into a spring constant to displacement relationship as shown in block 106. Next, a geometry is selected for the isolator system as seen in block 108. Appropriate structural material, e.g. elastomeric material, having the requisite performance characteristics is then selected as shown in block 110. The isolator system is then configured to shift frequencies at predetermined displacements upon impact within the desired impact absorption envelope as seen in block 112, such that the frequency shifting of the isolator system occurs at or prior to the isolator attaining resonance after impact.

As used herein, "impact absorption envelope" relates to parameters that an isolator system may be expected to withstand if and when the system is subjected to shock, vibration or impact. An impact absorption envelope may be determined by a user considering the intended use of an isolator system. As an example, a selected impact absorption envelope may be 30 g's or enough to provide capacity as an isolator system needing to displace no more than 5 inches with an equipment weighing 400 pounds. A natural frequency value can be determined from the predetermined absorption envelope value.

Conventionally, an ideal spring system displaces in proportion to the force that is applied to the system. These ideal spring systems are readily recognized by those skilled in the art as having a spring or material constant and having displacement generally described by the following Equation:

$$F = -kx \quad (1)$$

Equation 1 is known as Hooke's Law, wherein F denotes the force applied; k is the spring or material constant and x is the displacement.

Systems that vibrate are typically described as having harmonic motion, which is commonly described by Equation 2 below:

$$F = ma = m\frac{dv}{dt} = m\frac{d^2x}{dt^2} \quad (2)$$

Equation 2 is well known in the art, wherein the Force F is the product of the mass of the object and the second order derivative of the displacement x, as a function of time t.

The relationship between angular frequency and displacement may then be determined by the application of Equations 3 and 4 below. Equations 3 and 4 are known as the Displacement of an Oscillating System and the Natural Frequency of a Spring System equations, respectively. These equations are known solutions for the second order differential equation for displacement and natural frequency, as follows:

$$x = A\cos(\omega_0 t + \phi) \quad (3)$$

$$\omega_0 = \sqrt{k/m} \quad (4)$$

As can be seen from Equations 3 and 4V, the natural frequency, $\omega_0$ of a system is proportional to the spring constant, k, of the material. Using Equations 3 and 4, those skilled in the art can determine the natural or angular frequency as it relates to displacement of the system.

For a system that includes resistance or dampening for the impacts and shocks, the ideal equations are shown as follows:

$$F = Rv = R\frac{dx}{dt} \tag{5}$$

$$m\frac{d^2x}{dt^2} + R\frac{dx}{dt} + kx = 0 \tag{6}$$

$$x = e^{-\alpha t}A\cos(\omega_d t + \phi) \tag{7}$$

$$\alpha = R/(2m) \tag{8}$$

$$\omega_d = \sqrt{\omega_0^2 - \alpha^2} \tag{9}$$

The above Equations 7-9 denote solutions to the second order derivative equations for a system having resistance R with dampening; decay constant $\alpha$; and natural angular frequency $\omega_d$.

As noted in Equations 3 and 4, the natural frequency and sprung mass may be used to determine the spring constant of the isolator system. In other cases, the displacement and natural frequency may be used to determine the spring constant for the system. For vibrations, a typical equation may be:

$$k = (m/d)^{1/2} \tag{10}$$

wherein k is the spring constant; m is the sprung mass and d is the displacement. The displacement therefore, in view of equations 5-10, is dependent upon the natural frequency of the isolator system.

The design of an isolator system that can shift or jump frequency upon impact and as the system attains resonance also includes determining the structural requirements for a system that can meet the demands of that environment. Such determination includes establishing the weight of the sprung mass, establishing the shock and vibration input scope, and optimizing the design to enable frequency shifting at predetermined displacements.

The embodiments described herein set forth techniques for selecting a geometry that is usable to meet the requirements of the system. The determination of the geometry includes designing in buckling events, shapes and characteristics of the mount, and the like. For example, a mount that is usable in the present invention may include a designed-in buckling provision. Such buckling may be incorporated by material, shape, size, thickness, and the like.

The embodiments then describe a technique for defining the mechanical shape or geometry of the system dependent upon the desired spring factor throughout a given region. This method may rely on prior knowledge of the behavior of materials under dynamic loads, but can also be analyzed effectively by those skilled in the shock and vibration arts using many commercially available texts on deformable body mechanics, mathematics, materials and elastomerics, statics and dynamics, statistics, mechanical engineering-structural, shock and vibration energy transfer, among others.

Figure 4:
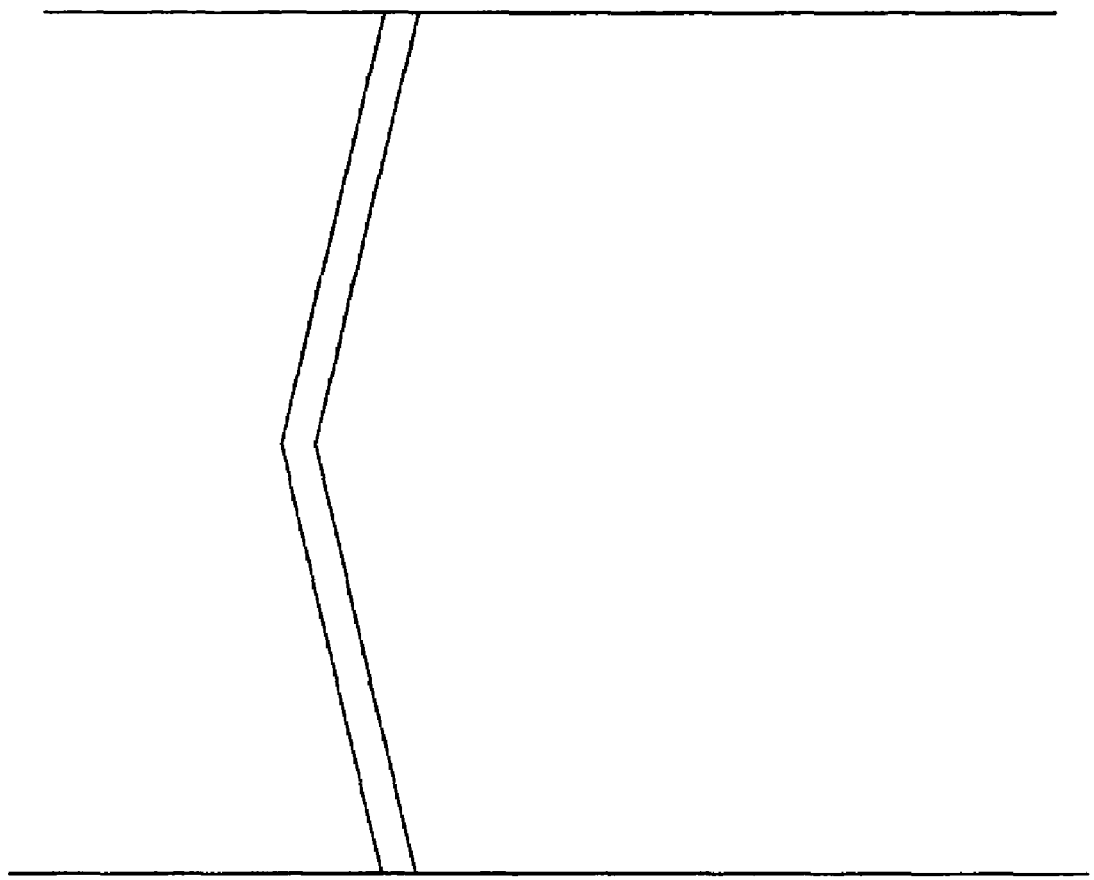
FIG. 4 is an illustration showing an elastomeric mount geometry in accordance with one embodiment of the present invention.
Figure 5:
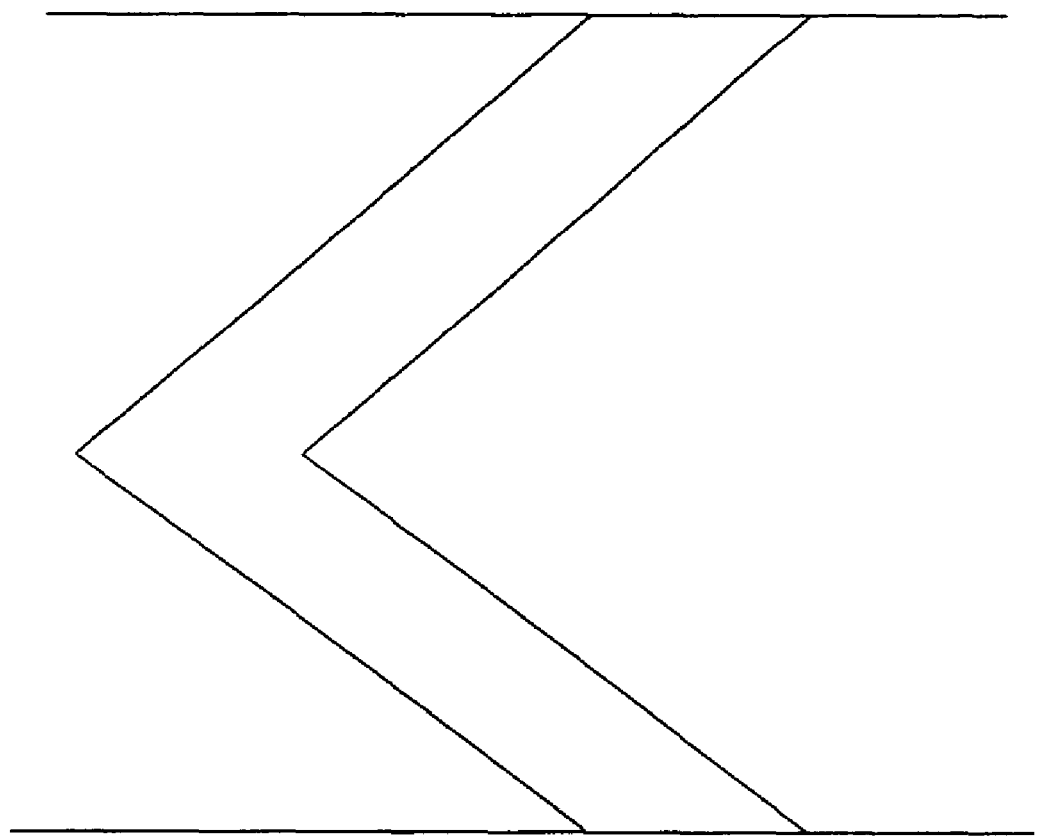
FIG. 5 is an illustration depicting another geometry usable to implement an elastomeric mount in accordance with one embodiment of the present invention.

As an example, for a system that will perform in a reasonably rigid or stiff manner throughout the first region of displacement, a preferred geometry would provide reasonable stiffness to the system, and after some displacement has occurred, would buckle, resulting in a much lower resultant spring force. FIGS. 4 and 5, discussed in more detail herein below, illustrate elastomeric mount geometries 400, 500 in accordance with alternative embodiments of the present invention and that satisfy this criteria.

Various elastomeric materials are usable to dampen shocks and vibrations. Some of these materials, as stated herein before, include natural rubbers, synthetic resins such as polyvinyl chlorides, polyurethanes, polyamides, polystyrenes, copolymerized polyvinyl chlorides, polyolefin synthetic rubbers, as well as urethanes, EPDM, styrene-butadiene rubbers, nitrites, isoprene, chloroprenes, polypropylene, and silicones. For some applications, the damping values of materials are readily available and may be used to facilitate choice of materials. Damping relates to the dissipation of energy by conversion to another form of energy such as heat. As an example, natural rubber has a damping value of 0.05; highly damped silicone has a value of over 0.13. Damping affects the magnitude of response with very little effect on the frequency of the response.

Depending on the material selection, an elastomeric mount may be constructed from a combination of materials such as silicone filled urethanes, or other desired configurations suitable for use as a mount. U.S. Pat. No. 6,394,435, entitled Shock Isolator System, issued May 28, 2002 to Monson, the inventor of the present invention, for example, discloses use of a Belleville washer to implement elastomeric damping and to dampen shocks. Other elastomeric damping configurations using different material combinations are disclosed in U.S. Pat. No. 6,749,924, entitled Stacked Sheet Shock Absorbing Elastomeric Device, issued Jun. 15, 2004 to Monson, et al. and U.S. Pat. No. 6,783,835, entitled Elastomeric Damping Sheets, issued Aug. 31, 2004 to McCollough, et al. The '435', '924' and '835' patents referenced above are assigned to Lockheed Martin Corporation, the assignee of the present invention.

The embodiments described herein disclose a technique for configuring a system that may be stiff, soft or a combination isolator mount system, thus providing the capacity to manage the frequency shifts of an isolator mount system as used in a known environment. Depending on need, an isolation system may provide the capacity to switch between a stiff, soft or a combined system, implying targeted capacity to provide good vibration isolation response, the capacity to absorb a large impact force, or a combination thereof.

In the design of an elastomeric mount that is usable in an isolator system, it is frequently useful to provide a buckling action within the performance of the mounts, to produce a flat region within the force-deflection curve, and provide the mount with a 'soft spot' that serves to cushion loads. In such instances, the spring constant preferably is non-linear, and changes with the displacement of the system, noting that the natural frequency of the system is dependent upon the displacement of the system, as it changes when the spring factor changes.

Figure 2:
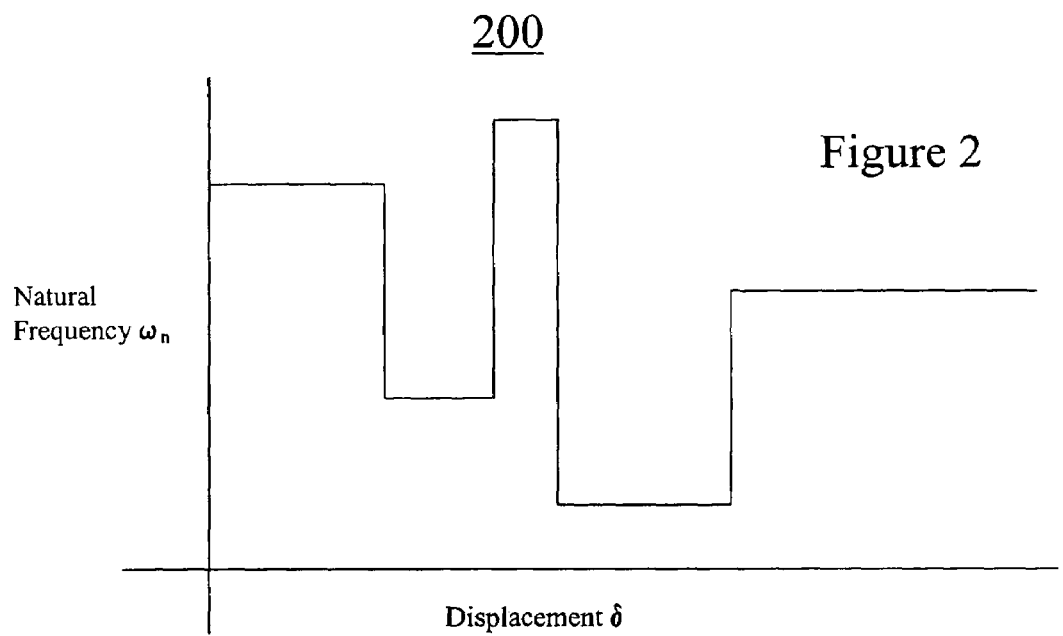
FIG. 2 is a graph illustrating the relationship between the system displacement and the inherent natural frequencies of a frequency-shifting isolator system/device according to one embodiment of the present invention.

The present invention utilizes this concept to design mounts that shift their frequency when the displacements of the mounts exceed a certain value. Thus, when the mounts go into a vibration resonance at or near the natural frequency, the mounts will begin to amplify the input, as the Transmissibility (Q) is greater than one. Transmissibility (Q), as known to those skilled in the art, is the ratio of the input amplitude to the output amplitude of the system; wherein the input amplitude is the result of external factors or disturbances while the output amplitude is caused by inherent properties of the system. When the displacement of the sprung mass exceeds the threshold value, the embodiments described herein in accordance with the principles of the present invention provide for a shift to a new inherent natural frequency such that the mounts are no longer in resonance. FIG. 2 is a graph. 200 illustrating the relationship between the system displacement $\delta$ and the inherent natural frequencies $\omega_n$ for one embodiment of the system. Thus, the embodiments implemented in accordance with the principles of the present invention provide an isolator mount system having a plurality of natural frequencies dependent upon the displacement of the mounts. With the incorporation of a designed-in hysteresis in the mount, the system is preferably suitable to avoid or eliminate "hunting" as described in further detail herein below.

As used herein, "hysteresis" is the change in threshold point dependent upon the direction of approach. "Hunting" of the system refers to the undesirable oscillation, which might be caused by a system with a large displacement, that shifts frequencies, which reduces displacement, and results in a shift back to the original frequency which results in greater displacements, and so on. This then creates a harmonic system behavior.

Figure 3:
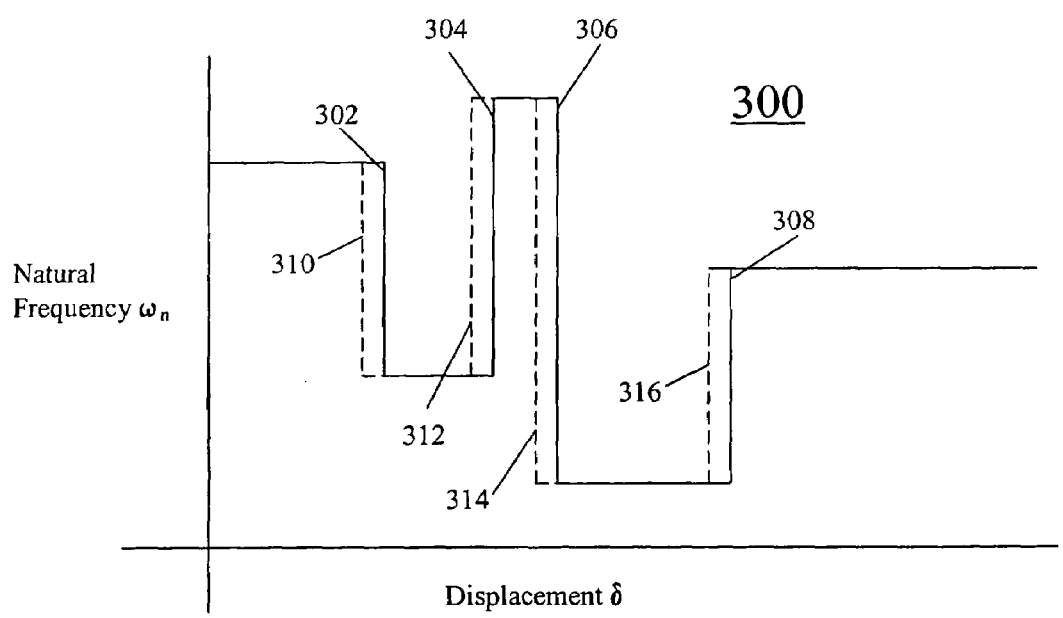
FIG. 3 is a graph illustrating a hysteresis plot associated with the system displacement and the inherent natural frequencies of a frequency-shifting isolator system/device according to one embodiment of the present invention.

FIG. 3 shows a graph 300 illustrating a hysteresis plot associated with one system embodiment implemented in accordance with the principles of the present invention. This system can be seen to exhibit four frequency shifting points, 302, 304, 306, 308, each having a distinct hysteresis characteristic along a different return path 310, 312, 314, 316. As the displacement increases from zero at a first natural frequency, the system exhibits a frequency shifting point 302, where the natural frequency drops back to a lower frequency. As the displacement increases at the lower frequency, a second frequency shifting point 304 is reached; and the natural frequency increases to a higher frequency. If instead, the displacement decreases at the lower frequency, the system will return to its first natural frequency along hysteresis path 310, and so on with the remaining frequency shifting points.

In some instances, an isolator system may be usable under shock or impact conditions as well as under normal vibration. As an example, an isolator system meeting above requirements for shock may also need to meet normal vibration requirements such as being usable at 50 Hz, displacing no more than 0.1 inches. To meet such requirements an isolator system according to the present invention can shift its frequency as the displacement increases such that resonance is generally avoided. As an example, the isolator system may be configured to shift from 50 Hz to about 13 Hz, thus changing the transmissibility of the system to below 1.

As shown in FIG. 4, which is an illustration showing an elastomeric mount geometry 400 in accordance with one embodiment of the present invention, the system may be deemed stiff, requiring stiffness proportional to the bulk modulus (B) of the material. This provides a high spring-back force, but as the displacement increases slightly, the column, which is preferably pliable, will buckle, removing any continuous vertical path of material between the two plates. This preferably results in the spring force being proportional to the shear modulus of the material, thus providing a desired significant shift in the performance of the isolator system. The amount of displacement occurring before the buckling event removes the vertical path through the material. Those skilled in the art of mechanical engineering and versed in the structural and shock and vibration arts can define the thickness and cross-section of this component of the mount required to achieve this performance from application of system dynamics and deformable body mechanics. Similarly, the appropriate angle for each of the structural elements with respect to the loaded surfaces may also be defined.

Looking now at FIG. 5, which illustrates another geometry 500 usable to implement an elastomeric mount in accordance with one embodiment of the present invention, the cross-sectional area may also be larger than that shown in FIG. 4, since reliance is on the shear modulus of the material for spring-back force. The angle of the resultant walls is defined by the cros-sectional area, and requiring no overlap between the top and center sections, which will guarantee there will be no compressive path between the sprung weight and the isolation surface. Preferably, this system may provide a virtually constant spring-back force throughout the vertical displacement, or until the opposite sides begin impinging upon one another.

The inventive embodiments also define a system that would shift to a different natural frequency when the displacement exceeds an upper limit. Such a system is desirable to accommodate the unexpected surges in force within the impact envelope. As an example, a system designed for an expected shock of 60 g's may actually be subjected to an impact that is twice the expected shock value. The techniques described herein allow for providing a system design that is adaptable to absorb the expected shock and provide a fail safe mechanism to cushion a potentially catastrophic shock pulse.

FIG. 5 then illustrates a softer system that will allow a significant displacement of the isolated mass with a relatively constant return force. It is easy to see that in this instance, the material geometry would remain in a shear mode for most of the displacement of the spring or material.

With careful design, the method of the present invention may be used to dynamically shift mounts to other frequencies when the system is approaching resonance, preferably with mounts that exhibit a non-linear spring or material constant.

Preferably, the method of the present invention is utilized to define the geometry of a frequency shifting mount prior to or in lieu of significant empirical testing. As illustrated herein, the method of the present invention differs from conventional design of isolator mounts, in that, the geometry of the mount is generated prior to empirical evaluations, based upon a desired natural frequency-displacement relationship such as illustrated in FIG. 3.

A desired spring constant may be determined for the isolator mounts within certain regions based upon the sprung mass and desired displacement. These constants may remain constant for a range of displacements, or they may be shifting throughout a displacement area, dependent upon the desired performance envelope or assembly constraints with the isolation system.

In use, a combination of these designs may be incorporated into the frequency shifting isolator mount system for a particular impact absorption envelope and displacement versus natural frequency profile.

In summary explanation, known isolation mount design techniques generally commence by using an existing design and then modifying the design to produce a stronger or weaker isolator, which will impact the force-displacement curve. Another typical approach utilizes intrinsic knowledge of mathematics, materials and elastomerics, statics and dynamics, deformable body mechanics, statistics, mechanical engineering-structural, shock and vibration energy transfer, among others to define an isolator with the intent of producing a specific force-displacement curve. In contradistinction, the present invention does not concern the force-displacement of a given mounting system, but rather the displacement-spring constant relationship, which can be easily translated to a displacement-natural frequency relationship.

Isolation mount design according to the principles of the present invention is optimized to change the natural frequencies when displacements change by a significant amount, which enables a system to jump frequencies, similar to a spread-spectrum approach to implement an isolation system solution.

Figure 6:
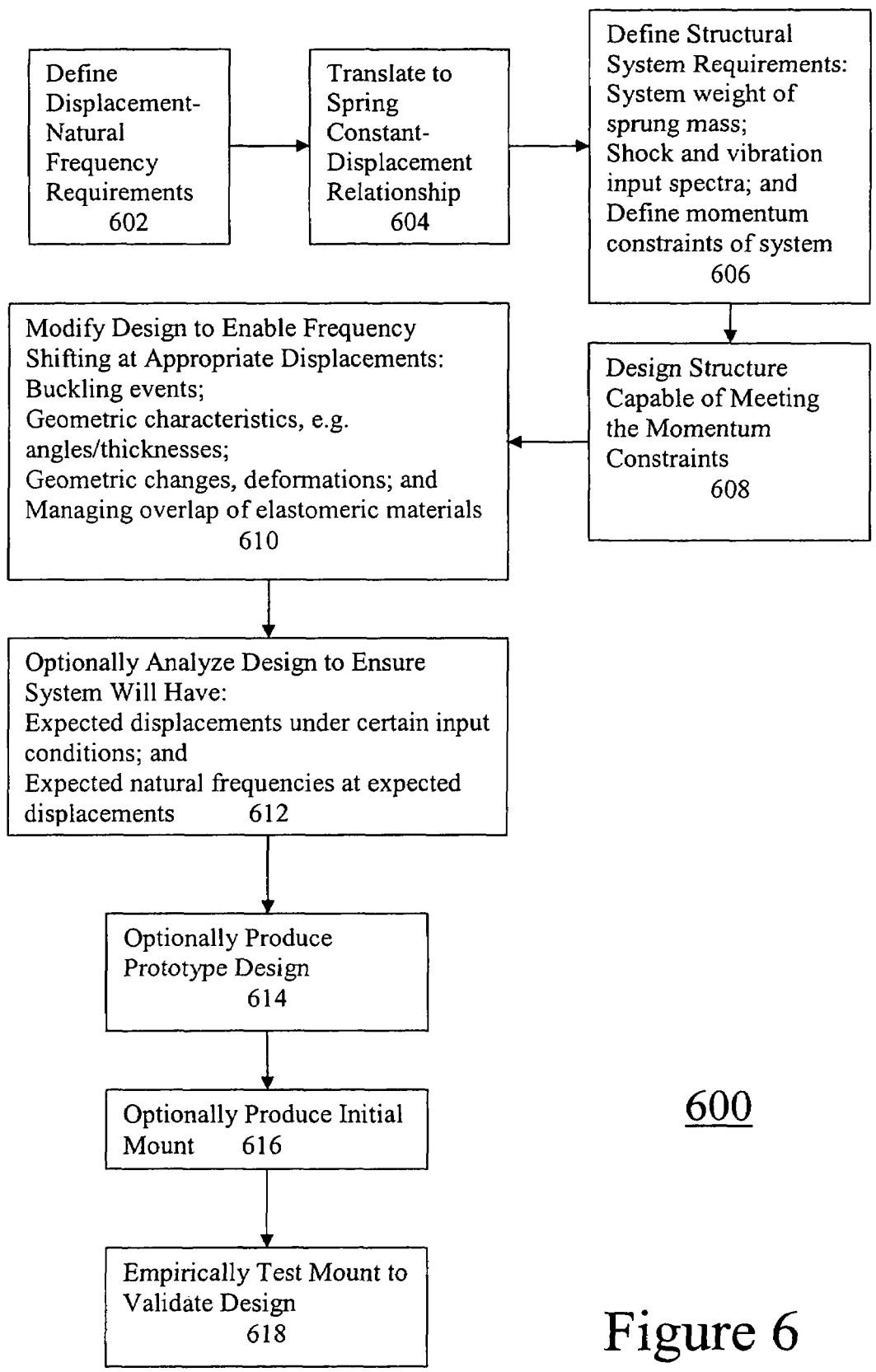
FIG. 6 is a more detailed flowchart depicting process steps for designing a frequency-shifting isolator system/device in accordance with the principles of the present invention.

FIG. 6 is a more detailed flowchart illustrating a method 600 of steps for designing a frequency-shifting isolator system/device in accordance with the principles of the present invention. With reference now to FIG. 6, shock isolator performance can be seen to be defined by first defining a displacement-natural frequency relationship, which is then translated into a physical isolator design. Most preferably this process can be described as follows:

Define the displacement-natural frequency requirements as depicted in block 602;
Translate to a displacement-spring factor requirement as depicted in block 604;
Define the structural requirements of the system as depicted in block 606, including
  System weight of the sprung mass,
  Shock and vibration input spectra,
  Define the momentum constraints of the system;
Design a structure capable of meeting the momentum constraints as depicted in block 608;
Modify the design to enable frequency shifting at appropriate displacements as depicted in block 610, by designing in
  Buckling events,
  Geometric characteristics—e.g. angles and thicknesses,
  Geometric changes, deformations, and
  Managing the overlap of the elastomeric materials.

Further process steps may optionally include:
Analyze the design as depicted in block 612 to ensure that the system will have
  Expected displacements under certain input conditions, and
  Expected natural frequencies at expected displacement;
Produce the prototype design as depicted in block 614;
Produce the initial mount as depicted in block 616; and
Empirically test the mount to validate the design as depicted in block 618.

The detailed description of the preferred embodiments discussed herein above, therefore describe an optimization process or method by which an isolation mount is designed with the specific intention of shifting frequencies such that a frequency jump occurs when at or near a resonance condition.

Figure 7:
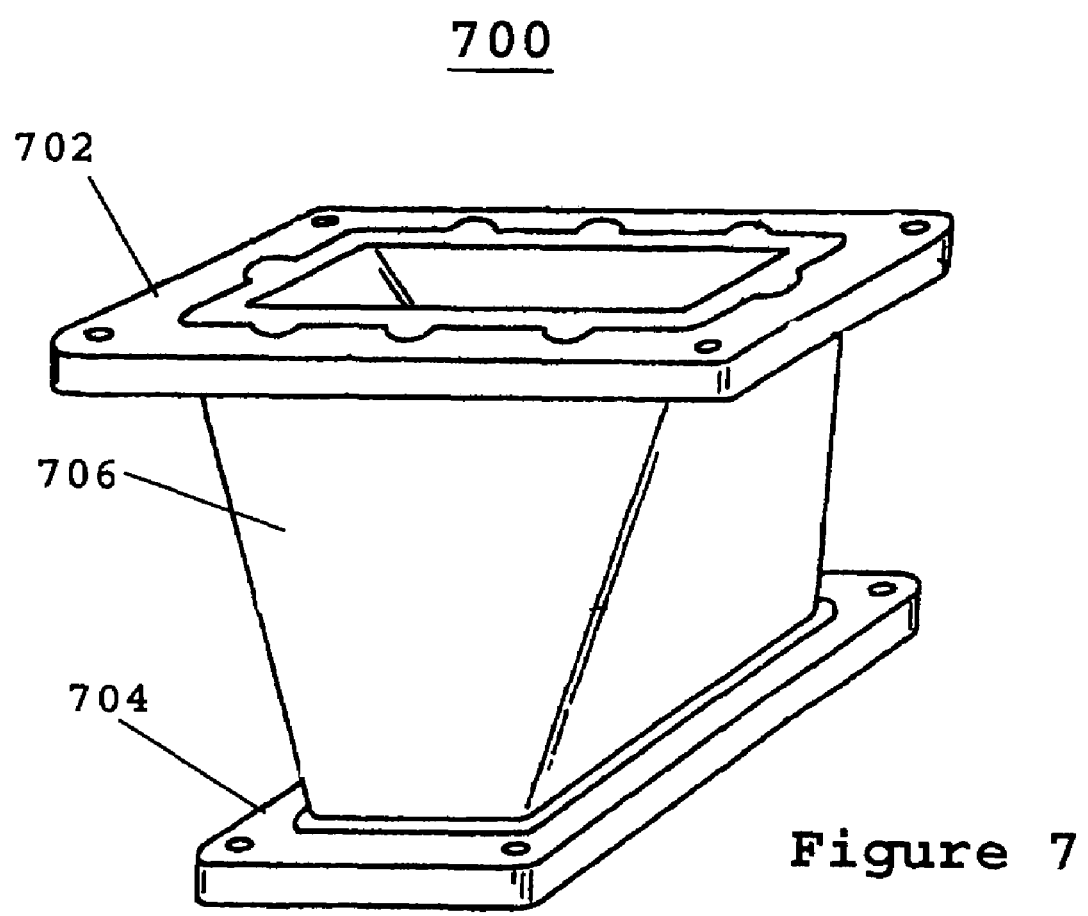
FIG. 7 is a perspective view of a frequency shifting isolator system according to one embodiment of the present invention.

A perspective view of a frequency shifting isolator system 700 according to one embodiment of the present invention and that is implemented in accordance with the method 600 described herein above with reference to FIG. 6 is shown in FIG. 7. The frequency shifting isolator system 700 can be seen to include an upper mounting plate 702, a lower mounting plate 704 and an isolation mount 706 connecting the upper and lower mounting plates 702, 704. The isolation mount 706 is configured in the requisite geometry to implement desired damping characteristics applicable in association with a particular impact absorption envelope.

Figure 8:
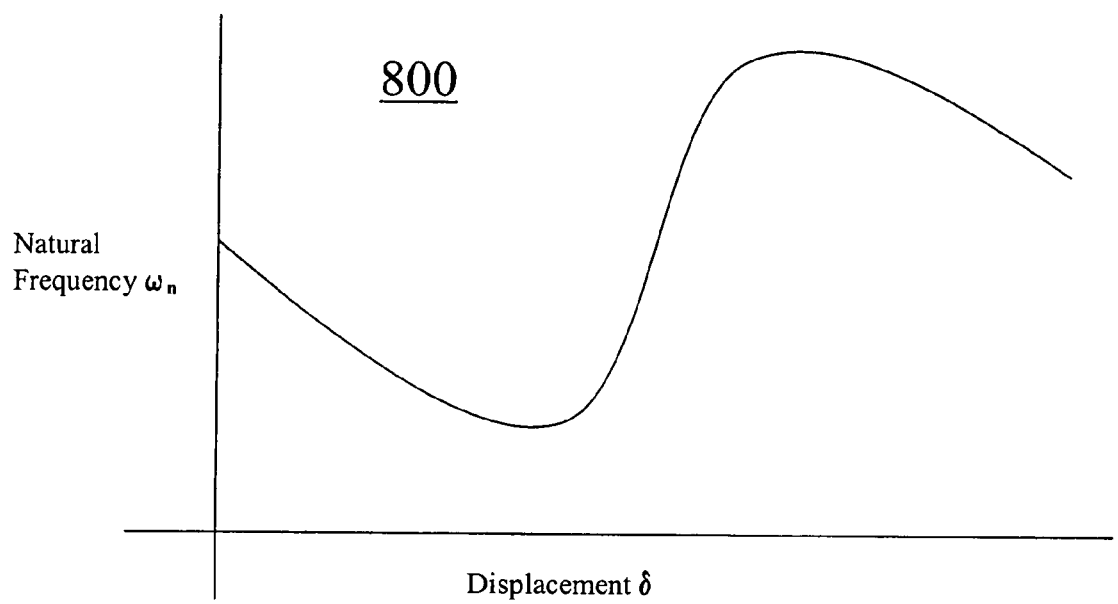
FIG. 8 is a graph illustrating a displacement-natural frequency relationship for a non-linear spring-constant frequency-shifting isolator system/device according to one embodiment of the present invention.

Having thus described the preferred embodiments of the present invention, those of skill in the art will readily appreciate that the teachings found herein may be applied to yet other embodiments within the scope of the claims hereto attached. For example, although the embodiments described herein before address a finite number of natural frequencies, the present invention is not so limited. Those skilled in the art shall readily understand that a frequency shifting isolator system can just as easily be implemented in accordance with the principles of the present invention using a nonlinear spring-constant system which will result in a system having virtually an infinite number of natural frequencies such as that depicted in FIG. 8 that shows a graph illustrating a displacement-natural frequency relationship 800 for a nonlinear spring-constant system. The complete disclosure of all patents, patent documents, and publications are incorporated herein by reference as if individually incorporated.

What is claimed is:

1. A method for optimizing a frequency-shifting isolator system, the steps comprising:
  determining a desired impact absorption envelope from a displacement-natural frequency requirement of the frequency-shifting isolator system;
  defining a set of structural system requirements within the desired impact absorption envelope;
  selecting at least one geometry for the frequency shifting isolator system that conforms to the set of structural system requirements; and
  selecting a desired structural material formed in the at least one geometry, the material configured to shift frequencies at a plurality of displacements upon impact within the desired impact absorption envelope, such that the frequency shifts occur in response to one or more of the plurality of displacements.

2. The method of claim 1, wherein the displacement-natural frequency relationship is translated to form a displacement-spring constant requirement of the frequency-shifting isolator system.

3. The method of claim 1, wherein the set of structural system requirements of the frequency-shifting isolator system is defined without regard to any force-displacement relationship.

4. The method of claim 1, wherein the selected at least one geometry of the frequency-shifting isolator system is determined without regard to any force-displacement relationship.

5. The method of claim 1, wherein the desired structural material configured in the selected at least one geometry is further selected from three-dimensional shapes.

6. The method of claim 1, wherein the desired structural material comprises an elastomeric damping material.

7. The method of claim 1, wherein the selected at least one geometry is non-linear such that the plurality of displacements of the frequency-shifting isolator system is a function of a plurality of natural frequencies of the selected at least one geometry.

8. The method of claim 1, wherein the desired structural material comprises a non-linear material such that the plurality of displacements of the frequency-shifting isolator system is a function of a plurality of natural frequencies of the selected at least one geometry.

9. The method of claim 1, wherein the step of establishing a desired impact absorption envelope comprises the steps of:
  defining a frequency-shifting isolator system displacement-natural frequency requirement; and
  translating the displacement-natural frequency requirement to a displacement-spring factor requirement.

10. The method of claim 1, wherein the step of defining a set of structural system requirements within the desired impact absorption envelope comprises the steps of:
  establishing system weight of a sprung mass;
  establishing shock and vibration input spectra; and
  defining momentum constraints of the system.

11. The method of claim 1, wherein the step of selecting the at least one geometry for the frequency-shifting isolator system that conforms to the set of structural system requirements comprises the steps of:
  formulating a structure capable of meeting the momentum constraints; and
  modifying the structure to enable frequency shifting at appropriate displacements.

12. The method of claim 11, wherein the step of modifying the structure to enable frequency shifting at appropriate displacements comprises the steps of:
- implementing the structure to incorporate desired buckling events;
- implementing the structure to incorporate desired geometric characteristics; and
- managing any overlap of the structural materials.

13. The method of claim 12, wherein the desired geometric characteristics comprise angles and thicknesses.

14. The method of claim 12, further comprising the step of analyzing the modified structure to ensure the system will have expected displacements under defined input conditions.

15. The method of claim 14, further comprising the step of analyzing the modified structure to ensure the system will have expected natural frequencies at expected displacements.

16. The method of claim 15, further comprising the step of producing a prototype frequency-shifting isolator system.

17. The method of claim 16, further comprising the step of producing an initial mount comprising the prototype frequency-shifting isolator system.

18. The method of claim 17, further comprising the step of empirically testing the mount to validate the design of the initial mount.

19. A method of designing a frequency-shifting isolator system, the method comprising the steps of:
- defining requisite displacement-natural frequency requirements;
- translating the requisite displacement-natural frequency requirements to displacement-spring factor requirements;
- defining requisite frequency-shifting isolator system structural requirements based on the displacement-natural frequency requirements;
- implementing at least one frequency-shifting isolator system structure that conforms to the structural requirements; and
- modifying the at least one frequency-shifting isolator system structure to enable frequency shifting at desired displacements.

20. The method of claim 19, wherein the structural requirements of the frequency shifting isolator system are defined without regard to any force-displacement relationship.

21. The method of claim 19, wherein the step of defining requisite frequency-shifting isolator system structural requirements based on the displacement-natural frequency requirements comprises the steps of:
- establishing system weight of a sprung mass;
- establishing shock and vibration input spectra; and
- defining momentum constraints of the system.

22. The method of claim 21, wherein the step of implementing at least one frequency-shifting isolator system structure that conforms to the structural requirements comprises the steps of:
- formulating a structure capable of meeting the momentum constraints; and
- modifying the structure to enable frequency shifting at desired displacements.

23. The method of claim 22, wherein the step of modifying the structure to enable frequency shifting at desired displacements comprises the steps of:
- implementing the structure to incorporate desired buckling events;
- implementing the structure to incorporate desired geometric characteristics; and
- managing any overlap of structural materials.

24. The method of claim 19, further comprising the step of analyzing the modified structure to ensure the system will have expected displacements under defined input conditions.

25. The method of claim 24, further comprising the step of analyzing the modified structure to ensure the system will have expected natural frequencies at expected displacements.

26. The method of claim 25, further comprising the step of producing a prototype frequency-shifting isolator system.

27. The method of claim 26, further comprising the step of producing an initial mount comprising the prototype frequency-shifting isolator system.

28. The method of claim 27, further comprising the step of empirically testing the mount to validate the design of the initial mount.

29. The method of claim 19, wherein the step of implementing at least one frequency-shifting isolator system structure that conforms to the structural requirements comprises implementing at least one frequency-shifting isolator system structure via a non-linear geometry such that the system exhibits virtually an infinite number of natural frequencies.

30. The method of claim 19, wherein the step of implementing at least one frequency-shifting isolator system structure that conforms to the structural requirements comprises implementing at least one frequency-shifting isolator system structure via a non-linear material such that the system exhibits virtually an infinite number of natural frequencies.

31. The method of claim 19, wherein the step of implementing at least one frequency-shifting isolator system structure that conforms to the structural requirements comprises implementing at least one frequency-shifting isolator system structure via an elastomeric damping material.

* * * * *